US012764039B2

(12) United States Patent
Lozada Cristobal et al.

(10) Patent No.: US 12,764,039 B2
(45) Date of Patent: Oct. 13, 2026

(54) INTERACTING WITH NETWORK FUNCTIONS ASSOCIATED WITH A CELLULAR NETWORK

(71) Applicant: Boost SubscriberCo L.L.C., Englewood, CO (US)

(72) Inventors: Alberto Lozada Cristobal, Littleton, CO (US); Shradha Niranjan Desai, Denver, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 54 days.

(21) Appl. No.: 19/019,896

(22) Filed: Jan. 14, 2025

(65) Prior Publication Data

US 2026/0205381 A1 Jul. 16, 2026

(51) Int. Cl.
*H04L 41/22* (2022.01)
*H04L 9/40* (2022.01)

(52) U.S. Cl.
CPC .............. *H04L 41/22* (2013.01); *H04L 63/08* (2013.01)

(58) Field of Classification Search
CPC ................................ H04L 41/22; H04L 63/08
USPC .......................................................... 709/223
See application file for complete search history.

(56) References Cited

U.S. PATENT DOCUMENTS 10,917,308 B2 * 2/2021 Bhat .................. H04L 41/0645
2020/0162589 A1 * 5/2020 Vijayadharan ........ H04W 24/04
2021/0141896 A1 * 5/2021 Streit ..................... G06V 40/16
2022/0124844 A1 * 4/2022 Boyapalle ............. H04W 40/16
2022/0240213 A1 * 7/2022 Ly ......................... H04W 48/18
2023/0100322 A1 * 3/2023 Mengwasser ......... G06F 9/3844 712/239
2023/0289698 A1 * 9/2023 Bly .................. G06Q 10/06393
2024/0022895 A1 * 1/2024 Shahdad ............... H04W 48/16
2024/0022932 A1 * 1/2024 Shahdad ............... H04W 24/08
2024/0114382 A1 * 4/2024 Bahl ................... H04J 14/0257
2024/0267782 A1 * 8/2024 Munoz-Sanchez ... H04W 12/08
2024/0381122 A1 * 11/2024 Rank ..................... H04W 24/02
2024/0413892 A1 * 12/2024 Nesteroff ........... H04B 7/18519
2025/0184880 A1 * 6/2025 Cho ...................... H04W 48/18

FOREIGN PATENT DOCUMENTS

WO WO-2025012939 A1 * 1/2025 ............. H04L 43/10

OTHER PUBLICATIONS

Mirko Cano Soveri et al., "Network Slicing Security for 5G and 5G Advanced Systems", May 2023, 3GPP, https://www.3gpp.org/technologies/slicing-security (Year: 2023).*

* cited by examiner

*Primary Examiner* — Ruolei Zong
(74) *Attorney, Agent, or Firm* — Kilpatrick Townsend & Stockton LLP

(57) ABSTRACT

Systems, methods, and machine-readable media may provide for one or a combination of the following. A user interface (UI) may be caused to be displayed. The UI may include UI elements that identify network functions (NFs). The NFs may be associated with one or more of user equipment (UE), a radio access network (RAN), and/or a core network of a cellular network. A selection of a network function (NF) from the NFs may be received via the UI. Information associated with the NF may be obtained. The UI may be caused to be updated to display at least a portion of the information associated with the NF.

20 Claims, 11 Drawing Sheets

INTERACTING WITH NETWORK FUNCTIONS ASSOCIATED WITH A CELLULAR NETWORK

TECHNICAL FIELD

This disclosure generally relates to wireless networks, and more particularly to systems, methods, and machine-readable media for interacting with network functions associated with a cellular network.

BACKGROUND

Cellular networks are complex and large scale and involve many components often on the order of hundreds of thousands or more. When things go wrong with such systems, pinpointing sources of problems within the complex cellular network may be tremendously challenging. To efficiently troubleshoot problems, a detailed understanding of the network, of how call flows work, and of how routing protocols work is necessary but often insufficient to quickly identify problems, considering the complexities involved, the large number of components that need to be checked, and especially when tens, hundreds or more alarms are going off at approximately the same time. The troubleshooting process may be time-consuming, cumbersome, and expensive, particularly when scores of people are needed to try to figure out how to solve operational issues every morning, for example and when resources may be wasted misdiagnosing or troubleshooting many scenarios. Conventional means for mitigating operational issues experienced in cellular networks are lacking in their capabilities, efficiency, speed, adaptability, flexibility, and reliability.

Thus, there is a need for systems, methods, and machine-readable media that address the foregoing problems. This and other needs are addressed by the present disclosure.

BRIEF SUMMARY

Certain embodiments generally relate to wireless networks, and more particularly to systems, methods, and machine-readable media for interacting with network functions associated with a cellular network.

In one aspect, a system may include one or more processing devices and memory communicatively coupled with, and readable by, the one or more processing devices and having stored therein processor-readable instructions which, when executed by the one or more processing devices, cause the system to perform one or a combination of the following operations. A user interface (UI) may be caused to be displayed. The UI may include UI elements that identify network functions (NFs). The NFs may be associated with one or more of user equipment (UE), a radio access network (RAN), and/or a core network of a cellular network. A selection of a network function (NF) from the NFs may be received via the UI. Information associated with the NF may be obtained. The UI may be caused to be updated to display at least a portion of the information associated with the NF.

In another aspect, a method may include one or a combination of the following. A user interface (UI) may be caused to be displayed. The UI may include UI elements that identify network functions (NFs). The NFs may be associated with one or more of user equipment (UE), a radio access network (RAN), and/or a core network of a cellular network. A selection of a network function (NF) from the NFs may be received via the UI. Information associated with the NF may be obtained. The UI may be caused to be updated to display at least a portion of the information associated with the NF.

In yet another aspect, one or more non-transitory, machine-readable media having machine-readable instructions thereon which, when executed by one or more processing devices, cause a system to perform one or a combination of the following operations. A user interface (UI) may be caused to be displayed. The UI may include UI elements that identify network functions (NFs). The NFs may be associated with one or more of user equipment (UE), a radio access network (RAN), and/or a core network of a cellular network. A selection of a network function (NF) from the NFs may be received via the UI. Information associated with the NF may be obtained. The UI may be caused to be updated to display at least a portion of the information associated with the NF.

In various embodiments, the UI may indicate whether the NFs are associated with the UE, the RAN, or the core network. In various embodiments, the obtaining information associated with the NF may include providing authentication credentials to a network component corresponding to the NF. In various embodiments, the authentication credentials are particular to the network component corresponding to the NF, and others of the NFs require different authentication credentials. In various embodiments, a subsequent selection of a second NF from the NFs may be received via the UI. Second information associated with the second NF may be obtained based at least in part on providing second authentication credentials to a second network component corresponding to the second NF. The UI may be caused to be updated to display at least a portion of the second information associated with the second NF. In various embodiments, the portion of the information associated with the NF may include one or more current parameter values corresponding to the NF. In various embodiments, responsive to the selection of the NF, support material associated with the NF may be selected, and the UI may be caused to be updated to indicate the selected support material.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Disclosed embodiments according to the present disclosure may solve the above-mentioned problems. The implementations detailed herein may be implemented on a hardware-based and/or software-based cellular network. A hardware-based and/or software-based cellular network may use specialized or general-purpose computing hardware maintained directly by the cellular network provider to provide cellular services. Implementations detailed herein may be performed on a hybrid-cloud cellular network, such as detailed in relation to FIG. 1. Various embodiments will now be discussed in greater detail with reference to the accompanying figures, beginning with FIG. 1.

The core of a 5G New Radio (NR) cellular network may employ a service-based architecture (SBA) using a service-based interface. At the core of most modern networks and services is typically a cloud-based and virtualization-based platform. This is also the case for 5G networks. A cloud-based and virtualization-based platform may be programmable and may allow many different functions to be built, configured, connected, and deployed at the scale that is needed at the given time. The 3GPP defines an SBA whereby the control plane functionality and common data repositories of a 5G NR network are delivered by way of a set of interconnected network functions (NFs), each with authorization to access each other's services. SBAs may provide a modular framework from which common applications may be deployed using components of varying sources and suppliers. The service-based interface may function based on API calls.

Figure 1:
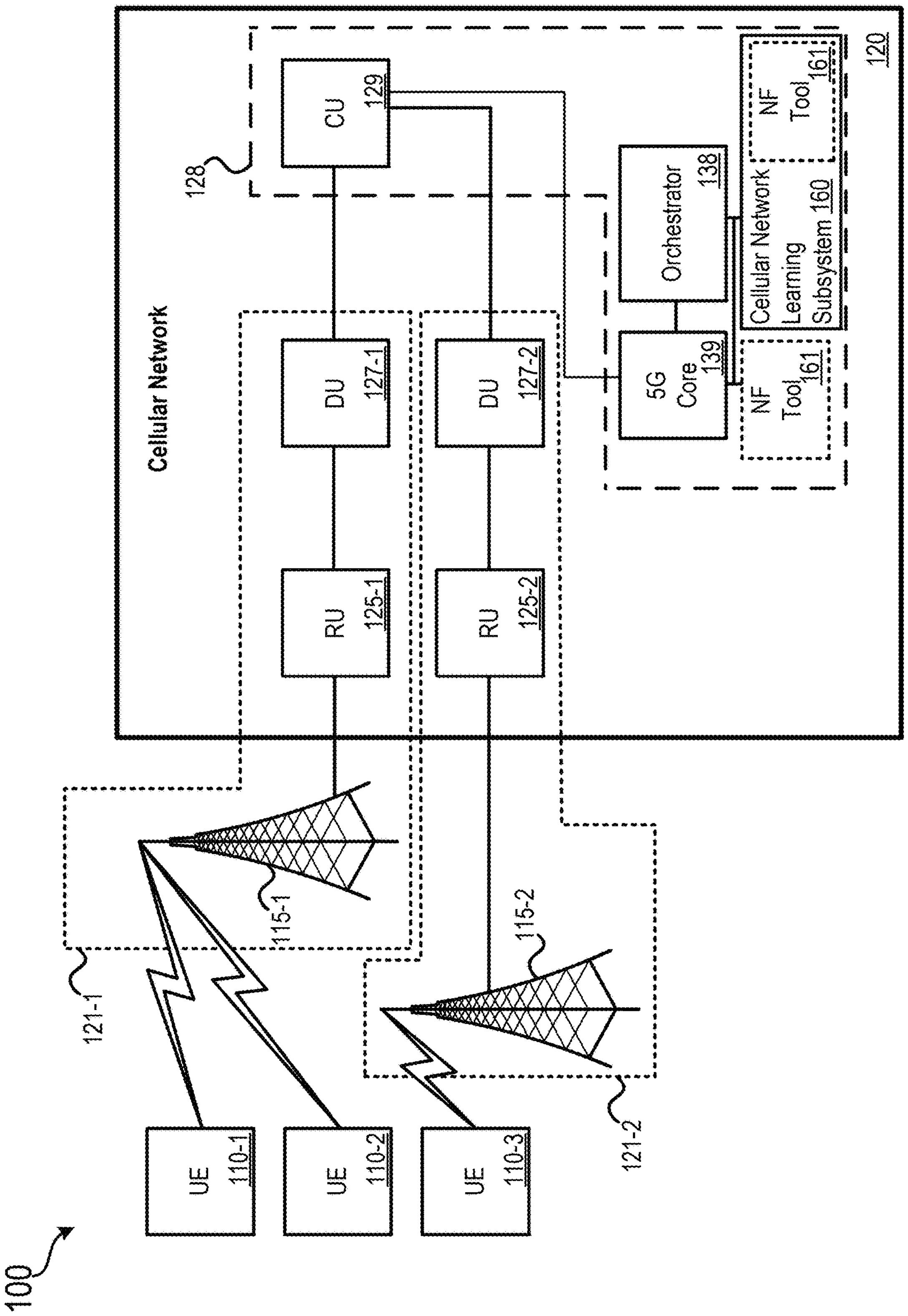
FIG. 1 illustrates an embodiment of a cellular network system, in accordance with example embodiments according to the present disclosure.

FIG. 1 illustrates a block diagram of a hybrid cellular network system ("system 100"). Such a hybrid cellular network system is partially implemented using specialized hardware and partially implemented using virtualized cellular network components on a cloud-computing platform, such as Amazon Web Services (AWS). System 100 may include a 5G New Radio (NR) cellular network; as noted, other types of cellular networks, such as 6G, 7G, etc., may also be possible. System 100 may include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In a virtualized open radio access network (O-RAN), because components may be implemented as specialized software executed on general-purpose hardware, except for components that need to receive and transmit RF, the functionality of the various components may be executed by general-purpose servers. For at least some components, the hardware may be maintained by a separate cloud-service computing platform provider. Therefore, the cellular network operator may operate some hardware, such as base stations that include RUs and local computing resources on which DUs are executed, such components may be connected with a cloud-computing platform on which other cellular network functions (NFs), such as the cellular network core and higher-level radio access network components, such as CUs, are executed.

UE 110 may represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE may represent any type of device that has an incorporated 5G interface, such as a 5G modem. Examples may include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated; BS 121-1 may include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas may reasonably be mounted to provide cellular coverage to a geographic area. Similarly, BS 121-2 may include: structure 115-2, RU 125-2, and DU 127-2.

Real-world implementations of system 100 may include many (e.g., thousands) of BSs and many CUs and 5G core 139. BS 121-1 may include one or more antennas that allow RUs 125 to communicate wirelessly with UEs 110. RUs 125 may represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU may also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 may communicate with 5G core 139. The specific architecture of cellular network 120 may vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 may vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components may be co-located or located at disparate physical server systems. For example, certain components of 5G core 139 may be co-located with components of CU 129.

In a possible virtualized implementation, CU 129, 5G core 139, and/or orchestrator 138 may be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component may be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 may execute CU 129, 5G core 139, and orchestrator 138. The cloud-computing platform 128 may be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, may be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. Rather, processing and storage capabilities of the data center would be devoted to the needed functions. When the need for the logical CU or subcomponents of the CU no longer exists, Kubernetes may allow for removal of the logical CU. Kubernetes may also be used to control the flow of data (e.g., messages) and inject a flow of data to various components. This arrangement may allow for the modification of nominal behavior of various layers.

The deployment, scaling, and management of such virtualized components may be managed by orchestrator 138. Orchestrator 138 may represent various software processes executed by underlying computer hardware. Orchestrator 138 may monitor cellular network 120 and determine the amount and location at which cellular network functions should be deployed to meet or attempt to meet service level agreements (SLAs) across slices of the cellular network.

Orchestrator 138 may allow for the instantiation of new cloud-based components of cellular network 120. As an example, to instantiate a new CU for test, orchestrator 138 may perform a pipeline of calling the CU code from a software repository incorporated as part of, or separate from cellular network 120, pulling corresponding configuration files (e.g. helm charts), creating Kubernetes nodes/pods, loading CU containers, configuring the CU, and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network may be reserved for individual network slices, thus allowing the individual network slices to reliably meet defined SLA requirements. By controlling the location and amount of computing and communication resources allocated to a network slice, the QoS and QoE for UE may be varied on different slices. A network slice may be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular parameters that may be set for a cellular network slice may include: uplink bandwidth per UE; downlink bandwidth per UE; aggregate uplink bandwidth for a client; aggregate downlink bandwidth for the client; maximum latency; access to particular services; and maximum permissible jitter. Particular network slices may only be reserved in particular geographic regions. For instance, a first set of network slices may be present at RU 125-1 and DU 127-1, and a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

The cellular network 120 may include a cellular network learning subsystem 160 (which may also be referenced herein as learning subsystem 160, control subsystem 160, modeling subsystem 160, or subsystem 160) and one or more cellular network function (NF) tools 161 (which may also be referenced herein as an NF tool 161, a diagnostics tool 161, or a tool 161). In some embodiments, the subsystem 160 may include the tool 161; in some embodiments, the tool 161 may be separate from the subsystem 160. In various embodiments, the subsystem 160 may correspond to one or a combination of one or more portions or all of the cellular network 120, one or more portions or all of cloud-based cellular system components 128, and/or one or more portions or all of the orchestrator 138. In some embodiments, the subsystem 160 may include the orchestrator 138.

Figure 2:
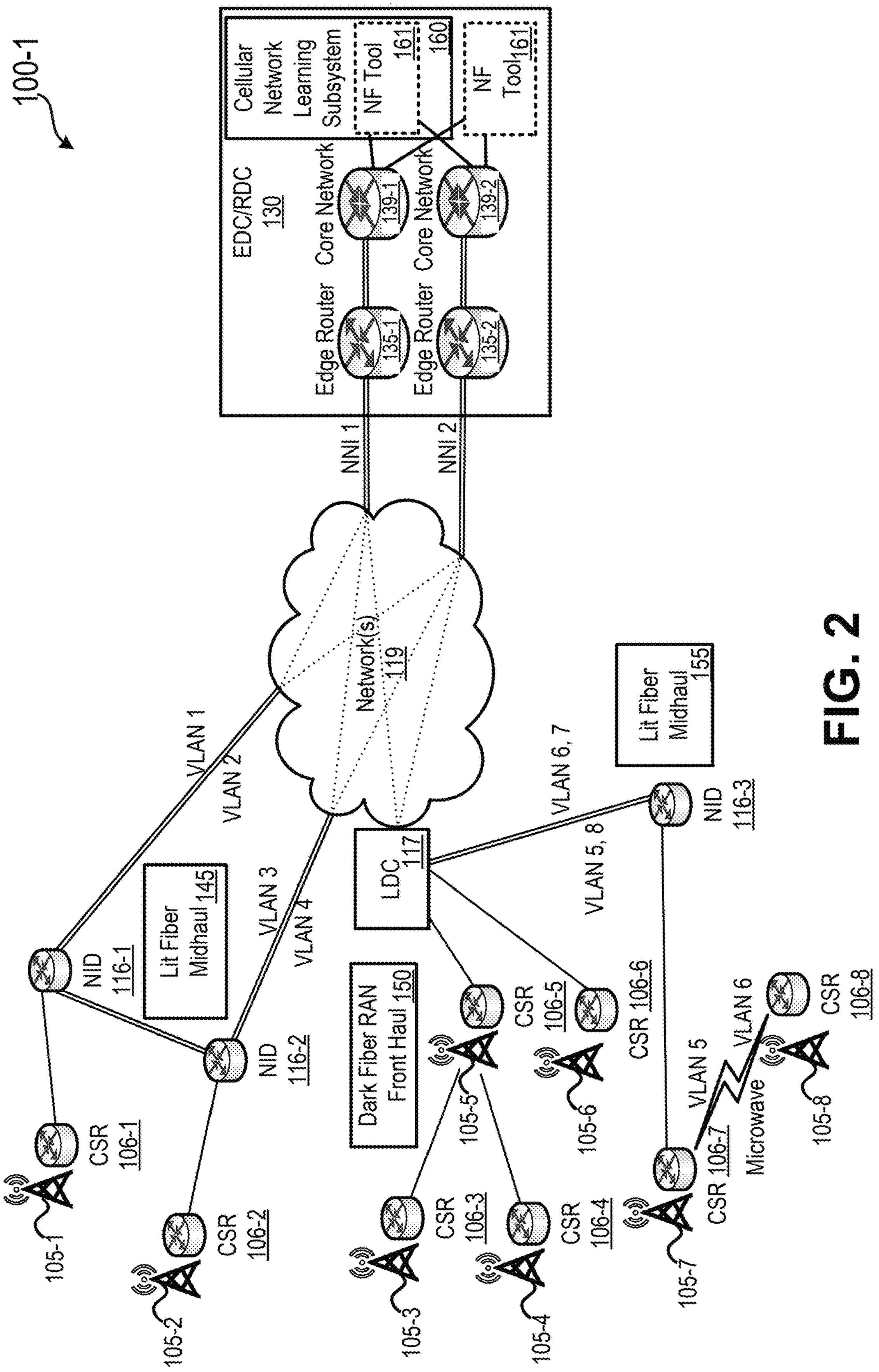
FIG. 2 illustrates an embodiment of an architecture for the cellular network system, in accordance with example embodiments according to the present disclosure.

FIG. 2 illustrates an embodiment of an architecture for the cellular network system 100-1 ("system 100-1"). The system 100-1 may correspond to the system 100, with details regarding transport and distribution being illustrated in FIG. 2. Various embodiments according to the present disclosure may include one or a combination of the components of FIG. 2 and may correspond to different variations of thereof. The system 100-1 may include: cell sites 105 (cell site 105-1, cell site 105-2, cell site 105-3, cell site 105-4, cell site 105-5, cell site 105-6, cell site 105-7, cell site 105-8) communicatively coupled to cell site routers (CSRs) 106 (cell site router (CSR) 106-1, CSR 106-2, CSR 106-3, CSR 106-4, CSR 106-5, CSR 106-6, CSR 106-7, CSR 106-8); network interface devices (NIDs) 116 (network interface device (NID) 116-1, NID 116-2, NID 116-3); local data center (LDC) 117; network 119; edge data center (EDC) and regional data center (RDC) 130; edge routers 135 (edge router 135-1, edge router 135-2); cloud-based cellular network components (e.g., 128 in FIG. 1) corresponding to core network 139-1 and core network 139-2 (which may correspond to core 139 of FIG. 1); the cellular network model control subsystem 160; and/or the like.

The CSRs 106 may communicatively couple the cell sites 105 to other cell sites 105, NIDs 116, and/or the LDC 117. The NIDs 116 may be communicatively coupled to the LDC 117 and/or the network 119 with VLANs 1, 2, 3, 4, 5, 6, 7, 8. Each NID 116 may provide a connection between a CSR 106 and a VLAN, routing traffic between the CSR 106 and the VLAN. Each site may have its own set of one or more VLANs. A lit fiber midhaul 145 may include, for example, NIDs 116-1, 116-2, VLANs 1, 2, 3, 4, and corresponding connections, among other components of the system 100-1. A lit fiber midhaul 155 may include, for example, NID 116-3, VLANs 5, 6, 7, 8, and corresponding connections, among other components of the system 100-1. A dark fiber open RAN front haul 150 may include, for example, cell sites 105-3, 105-4, 105-5, CSRs 106-3, 106-4, 106-5, and the corresponding connections, among other components of the system 100-1. The cell sites 105, LDC 117, other components of the lit fiber midhauls 145, 155 and front haul 150, and/or the like may be connected, via network-to-network interface (NNI) 1, 2 connections, to the cloud-based cellular network components corresponding to network core 140 via dark fiber transport and/or lit fiber transport provided by network 119. Accordingly, the network 119 may include a fiberoptic network, which may include multiprotocol label switching technology.

System 100-1 may correspond to a 5G New Radio (NR) cellular network; other types of cellular networks, such as 6G, 7G, etc. may also be possible. In various embodiments, the cloud-based cellular network components may be executed with the overlay network infrastructure on a third-party cloud-based computing platform or a cloud-based computing platform operated by the same entity that operates the RAN. The cloud-based cellular network components may be executed as specialized software executed by underlying general-purpose computer servers. A cloud-based computing platform may have the ability to devote additional hardware resources to cloud-based cellular network components or implement additional instances of such components when requested. The overlay network infrastructure may be a virtual infrastructure and may include a specialized 5G core built and operated in the cloud with virtual machines to provide 5G services using the compute resources of the underlay cloud infrastructure. The overlay network infrastructure may include a routing architecture may be specially configured to overlay into that cloud environment and may provide for functions that require routing and that are not natively available with the cloud environment—e.g., border gateway protocol configurations, routing content objects with network functions that are virtual machines ultimately up in the cloud, and/or the like.

The cloud-based cellular network components 123 may include one or a combination of the edge routers 135, one or more EDCs and/or one or more RDCs 130. Such data centers may correspond to virtualized instantiations. Each RDC may serve primarily to route data among different data centers. A RDC may be in communication with multiple edge data centers. If data is to be routed among EDCs in direct communication with a RDC, components higher in the hierarchy of the cellular core network may not need to be involved in the routing of data. However, if data is being routed to an EDC not in direct communication with a RDC, a component higher in the hierarchy of the cellular core network may need to be used to complete the routing. Such a hierarchy may allow for data anywhere within the cellular network to be routed to other devices. EDCs and RDCs may collectively be referred to as nodes of the core cellular network. As illustrated, the system 100-1 may be configured with redundant services such that two (as in the illustrated example) or more different platforms may be implemented.

FIG. 2 illustrates some examples for logical connectivity of various components of the system 100-1. While FIG. 2 illustrates various components of the system 100-1, other embodiments of the system 100-1 may vary the arrangement, communication paths, and specific components of the system 100-1. In the example of system 100-1, only a small number of components are illustrated. In reality, the system 100-1 may include a much larger number of components. For example, the system 100-1 may include hundreds or thousands of cell sites 105 and corresponding components and connections. Greater numbers of NIDs 116, LDCs 117, EDCs/RCDs 130, and the like may be present. The system 100-1 may include greater numbers of levels within the hierarchy within the core cellular network and may include, for example, a national data center in some embodiments. Groups of EDCs 130 may have a dedicated bandwidth to communicate with cloud-based cellular network components. Therefore, it should be understood that the number and types of radio access network components that communicate with an EDC 130 may vary. Further, the components of the cellular core network that the EDC 130 communicates with may also vary.

There may be different aggregation points in the system 100-1. For example, a CSR 106 at a cell site 105 may be an aggregation point. The LDCs 117 may be the first aggregation points for the geographically distributed cell sites on dark fiber. An EDC 130 in a market may aggregate the lit fiber cell sites and all the market LDCs' traffic as well. An EDC 130 may also aggregate nearby dark fiber dell sites as well for a collocated LDC 117. An RDC 130 may serve as an aggregation point for multiple markets (EDC traffic). In a market, there may be one or more collocated RCD/EDCs 130, and/or LDCs 117. An NNI, being an interface that specifies signaling and management functions between the network 119 and the EDC/RDC 130, may, for example, aggregate up to 500 sites or more to one pipe to the EDC/RDC 130, in order to connect the pipeline to the cloud-based cellular network components 123.

In various embodiments, the subsystem 160 and/or the NF tool 161 may be communicatively coupled to the core network 130. In various embodiments, the subsystem 160 and/or the tool 161 may be executed and implemented with one or more processors, one or more computer systems, one or more other processing devices, one or more servers, one or more server systems, and/or the like. Components such as the subsystem 160 and/or the tool 161 and the 5G core of the core network 140 may include various software components that are required to communicate with each other, handle large volumes of data traffic and are able to properly respond to changes in the network. In some embodiments, detection, evaluation, and diagnostics of problems that arise during operation of the system 100-1 may be performed by the network the subsystem 160 and/or the NF tool 161. The subsystem 160 and/or the NF tool 161 may perform various software processes executed by underlying computer hardware. The network the subsystem 160 and/or the NF tool 161 may monitor other components of the system 100-1, assess alarms, and perform diagnostics with respect to the various components of the system 100-1.

In some embodiments, the subsystem 160 and/or the NF tool 161 may be implemented locally to a data center, such as EDC/RDC 130. In some embodiments, the subsystem 160 and/or the NF tool 161 may be implemented virtually as software being executed in the cloud with the overlay network infrastructure on top of the cloud underlayment infrastructure. In some embodiments, the subsystem 160 and/or the NF tool 161 may be implemented as a virtual machine. In the illustrated embodiment of system 100-1, the cloud-based cellular network components may include the subsystem 160 and/or the NF tool. In various embodiments, the NF tool 161 or instances thereof may be pushed to, and deployed for operation at, edge devices of the cellular network 120, LDCs 117, UEs 110, base stations 115, and/or the like.

Figure 3:
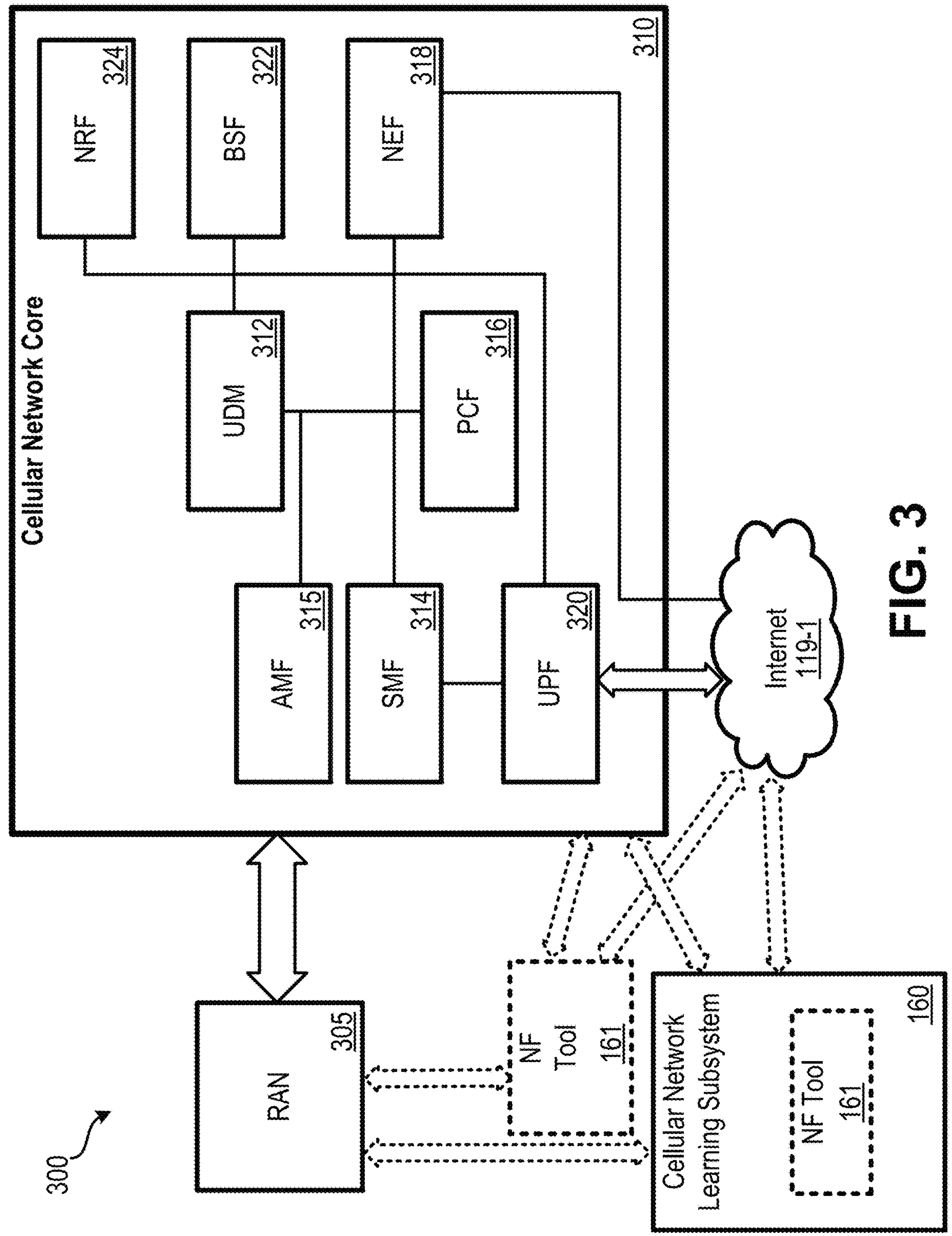
FIG. 3 illustrates an embodiment of the cellular network system that includes a cellular network core that is communicatively coupled with a cellular network learning subsystem and/or a network function (NF) tool, in accordance with example embodiments according to the present disclosure.

FIG. 3 illustrates an embodiment of a cellular network system 300 ("system 300") that includes a cellular network core that is communicatively coupled with the subsystem 160 and/or the NF tool 161, in accordance with embodiments according to the present disclosure. Cellular network core 310 ("core 310") may represent an embodiment of 5G core 139 of FIG. 1. Core 310 may include: Unified Data Management 312 ("UDM 312"); Session Management Function 314 ("SMF 314"); Access and Mobility Management Function 315 ("AMF 315"); Policy Control Function 316 ("PCF 316"); Network Exposure Function 318 ("NEF 318"); UPF 320; Binding Support Function 322 ("BSF 322"); and Network Repository Function ("NRF 324").

UDM 312 is a network function that manages access authorization, user registration, and roaming access. SMF 314 manages interactions on the data plane, creation and removal of protocol data unit sessions and managing session context with the UPF. AMF 315 is a control plane function that manages registration, authentication, connection, and session related information and tasks corresponding to UE. PCF 316 governs control plane functions and the UPF via defined policy rules. BSF 322 stores binding information for PDU sessions and facilitates discovery of NFs and events per the binding information. NRF 324 maintains a repository of the network functions instances and profiles and facilitates registration and discovery of network functions.

NEF 318 facilitates exposure of network services and capabilities to trusted components outside of the cellular network core. NEF 318 may act as a consolidated application programming interface (API) for components of core 310. Via NEF 318, permissions and access to data from core components, including UPF 320, may be controlled. NEF 318 may provide for application functions to securely provide information to a 3GPP network. In this case, the NEF may authenticate, authorize, and/or assist in throttling application functions.

UPF 320 is responsible for packet routing and forwarding between external networks from the cellular network (e.g., Internet 340) and UE communicating with RAN 305 of the cellular network. RAN 305 may represent BSs 121 of cellular network 120 of FIG. 1. UPF 320 functions as a gateway in that cellular network addressed traffic inside of core 310 and RAN 305 is translated to have an external IP address appropriate for communication via Internet 340. From the perspective of a UE, all inbound and outbound Internet communications flows through UPF 320.

Figure 4:
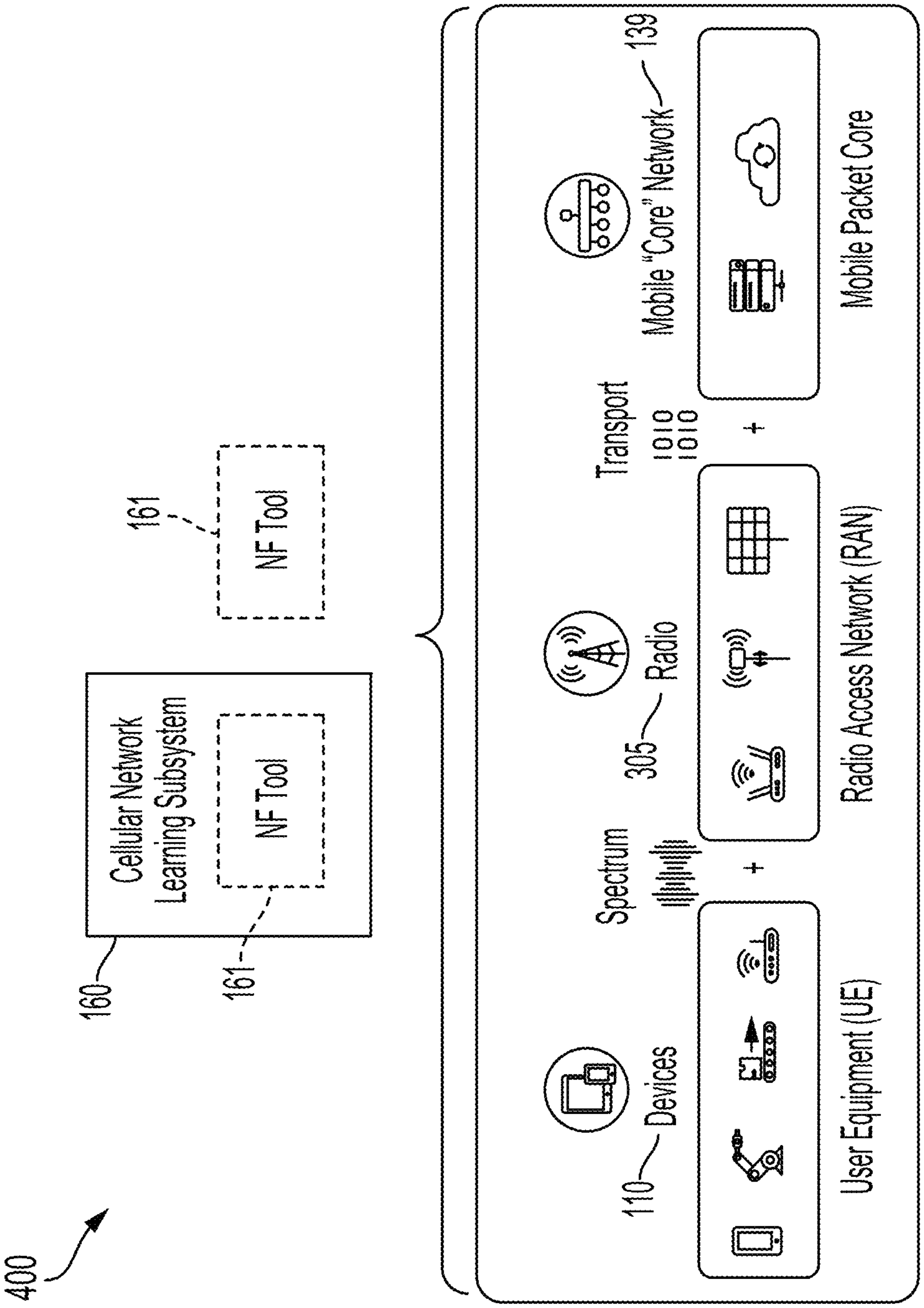
FIG. 4 illustrates an overview of the cellular network learning subsystem and the NF tool with respect to end-to-end connectivity for the cellular network, in accordance with embodiments according to the present disclosure.

FIG. 4 illustrates an overview of the cellular network learning subsystem 160 and the NF tool 161 with respect to end-to-end connectivity for a cellular network 400, in accordance with embodiments according to the present disclosure. In various embodiments, the system 400 may correspond to the systems 100, 100-1, 300, and/or the like. The tool 161 may improve the reliability and quality of experience of the cellular network 400.

The tool 161 may provide troubleshooting support that can adapt to different domains, vendors, technologies, and necessities. The tool 161 may be configured to provide an overview of the following domains: devices 110, RAN 305, and core network 139 (packet core and IP Multimedia Core Network Subsystem (IMS)). In some embodiments, the tool 161 may be subscriber-based. Certain embodiments may provide for the NF tool 161 as a real-time, query-based tool that can give information for the cellular network 400 from end to end. The tool 161 may be configured to check the UE device logs, the radio side logs, and the core side logs and to provide end-to-end network visibility to the front end (e.g., subscribers). For example, the tool 161 may be capable of getting, in real time, current status information from different network functions (NFs) and, with a graphical user interface (GUI), display the key parameters that are useful during a troubleshooting session.

Figure 5:
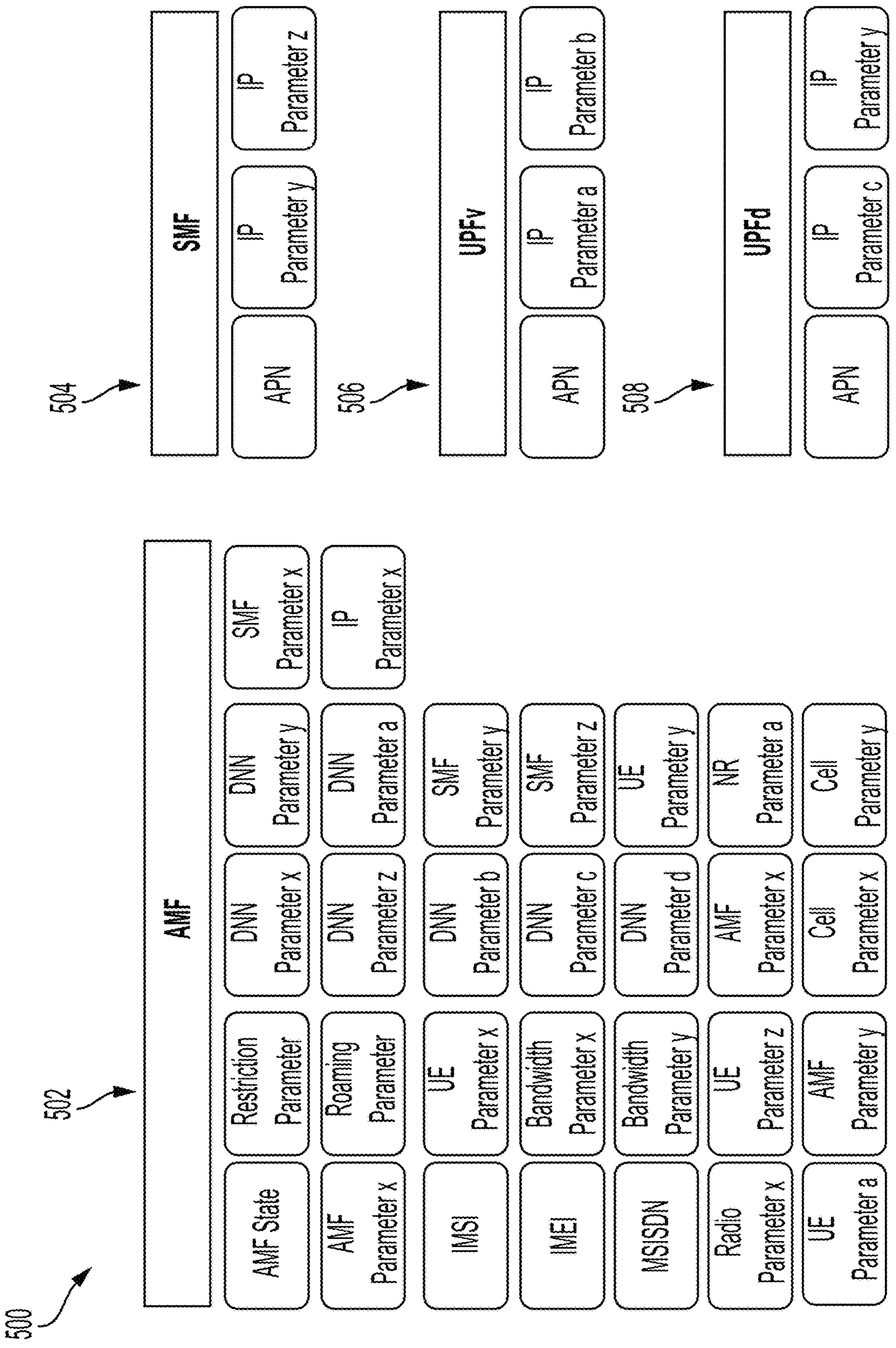
FIG. 5 illustrates some aspects of example packet core key parameters that may be displayed with a graphical user interface (GUI) facilitated by the cellular network learning subsystem and/or the NF tool, in accordance with embodiments of the present disclosure.

FIG. 5 is an illustration 500 of some aspects of example packet core key parameters that may be displayed with the GUI facilitated by the cellular network learning subsystem 160 and/or the NF tool 161, in accordance with embodiments according to the present disclosure. The GUI may correspond to a diagnostics interface 452 disclosed with respect to following figures. The illustration 500 shows example AMF parameters 502, example SMF parameters 504, example UPF voice parameters 506, and example UPF data parameters 508 that may be identified by the tool 161. Other examples are possible. The illustration 500 only shows core parameters, but the tool 161 may likewise identify RAN parameters and UE parameters, as well. Thus, the tool 161 may be configured to provide live network data that includes core-level data, as well as RAN-level data and UE-level data. In some embodiments, the set of parameters may be determined by the subsystem 160 and/or tool 161 to be the main parameters that are useful for troubleshooting (i.e., one or more selected sets of parameters) based at least in part on machine learning from past troubleshooting sessions. As disclosed herein, the subsystem 160 and/or tool 161 may be configured to learn from one or a combination of past troubleshooting data, network configuration data, alarm data, diagnostic rules, resolution requests, resolution results, and/or the like, which may include pattern data with any respect you want or a combination of such aspects.

There may be many different NFs in the core and in the RAN, for example, where separate entities may be handling certain tasks and different parameters. The tool 161 may obtain different information from all of the different NFs. For example, information selecting the AMF NF from the packet core may return current information about the AMF. In order to obtain parameters and information from the NFs, automated scripts may be created that the tool 161 may execute to log in and send commands to each NF to query the status information for a single subscriber, for example. In some embodiments, the tool 161 may be preconfigured with one or more automated scripts for such purposes. In some embodiments, the subsystem 160 and/or the tool 161 may create and/or update/customize one or more automated scripts, for example, as the subsystem 160 continues to learn and rank which parameters, network components, corresponding information, and/or the like are most useful for troubleshooting. The automated scripts may be capable of login and sending commands to each NF to query the status information for a single subscriber, providing visibility form the core and RAN domains, for example.

Using the example of the core, the AMF, the SMF, the UPF, and the other different network components in the core may have different commands and command syntaxes. Each one of such components may require a separate login. Moreover, the commands that work for one component (e.g., AMF) may not be the same commands that work for another component (e.g., SMF). That may be the case across all the components. Accordingly, one of the benefits of the tool 161 may be to simplify the troubleshooting time that would conventionally be spent because an engineer would need to start playing the detective every time that there is a there is an issue with a device, not knowing where the issue is. Conventional techniques require users to manually obtain status information from different NFs. With all the different NFs associated with a cellular network (different types as well as possibly being provided by different vendors), users must know how to query each of the different NFs to obtain the information they need. Conventionally, an engineer would need to log in to the AMF, for example, then get the basic parameters to take a trace and, if the AMF looks fine, would need to follow a chain and check the next component, and so on. Many times, users are not proficient in the operations needed to obtain the information. Prior techniques require users to spend much more time obtaining NF information compared to the embodiments disclosed herein. For example, using the tool 161, a user may easily select a NF and display information about the parameters associated with that NF. The tool 161 may be used to view information about NFs that are associated with UE, RANs, and/or the core network.

The tool 161 may improve the trouble ticket escalation process by making the initial analyses more accurate such a user (e.g., a user associated with a network operations center) need not blindly open a trouble ticket. The tool 161 and GUI may decrease the time it takes to troubleshoot. The tool 161 may reduce manual effort needed (e.g., to log in and check every network function for an engineer to troubleshoot) by consolidating information from different sources in a customized, single view. The tool 161 may provide its various advantages to users so that the users need not have subject matter expertise in the telecommunications field. The tool 161 may reduce the time spend on diagnosing possible subscriber issues and/or failures. For example, a user that identifies instances of no service availability, call drops, or any issue may be able to just enter into the GUI a subscriber identification, such as a phone number, IMSI (International Mobile Subscriber Identity), and/or the like identifier, to check where an issue lies. The tool 161 may perform one or more levels of checking so that time is not wasted in troubleshooting each and every network function. With the subscriber identification information, the tool 161 may execute one or more scripts across all the different network entities at the same time, as a one-time query with one user interface selection (e.g., one click), for example, and then the tool 161 may retrieve information from all the different entities simultaneously (e.g., executing multiple, parallel queries across the core and radio domains) without a user actually have to log into each one of them.

Using the subscriber identification, the tool 161 may filter the information (e.g., parameter values and related information) pulled from the different network entities (e.g., the selected NFs and corresponding selected set of parameters learned over time to be useful to troubleshooting and which may be automatically refined to add or remove various NFs and/or parameters from the set) to determine only the results related to the particular subscriber and/or instances of no service availability, call drops, and/or the like issues related to the particular subscriber. In some embodiments, the tool 161 may use the one or more scripts to perform the filtering, with the execution of the one or more scripts include multiple phases, at least one of which includes the filtering. The one or more filters may be defined by the tool 161 and/or the subsystem 160 to include one or more parameter filters based on the machine learning of which NFs and parameters have been useful to troubleshooting, as disclosed further herein. Advantageously, such filtering may aid users that do not have the necessary background or experience that may be required to understand thousands of lines of parameters, for example. In some embodiments, the filtered results may be displayed with a diagnostics interface, which may correspond to a GUI, facilitated by the subsystem 160 and/or the tool 161. The filtered results may be classified by the subsystem 160 and/or the tool 161 and displayed with the diagnostics interface in an organized manner. The subsystem 160 and/or the tool 161, using the rules, scoring, and learning features disclosed herein, may rank the parameters according to the likelihood of usefulness to troubleshooting and only disclose the top-ranked 5, 10, 20, etc. lines of parameters.

Figure 6:
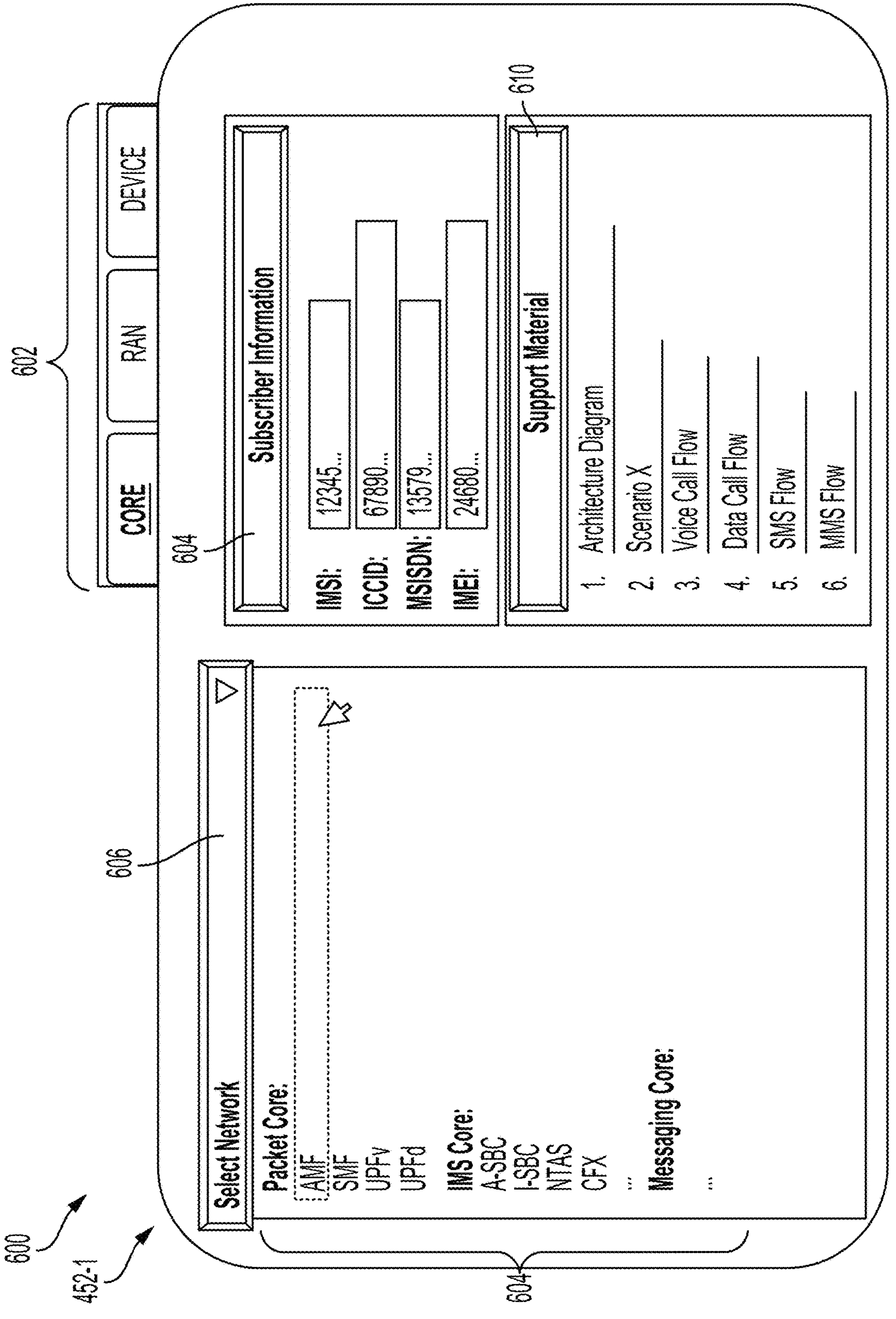
FIGS. 6, 7, and 8 are graphical user interface examples of some aspects of a diagnostics interface, in accordance with embodiments according to the present disclosure.
Figure 7:
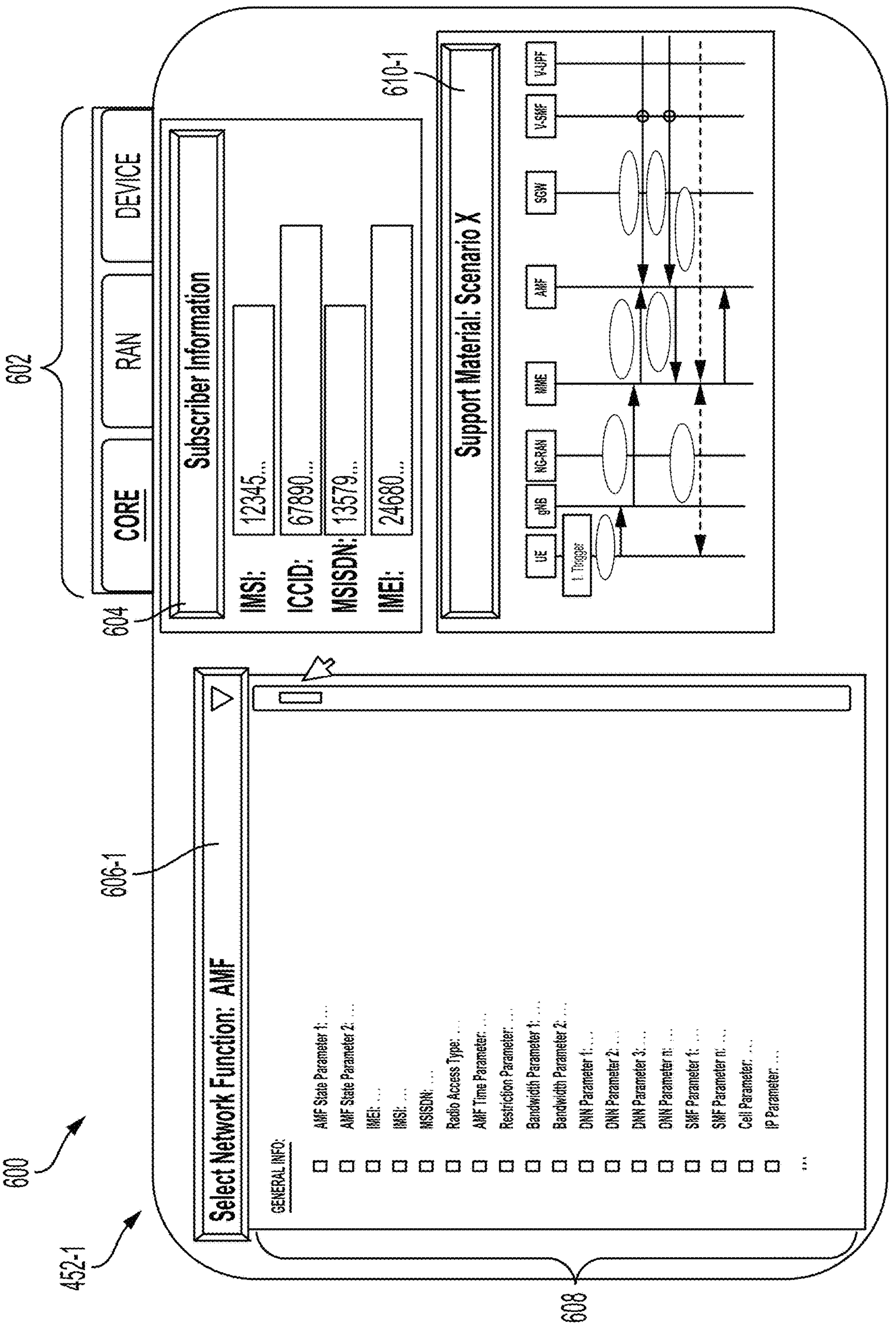
Figure 8:
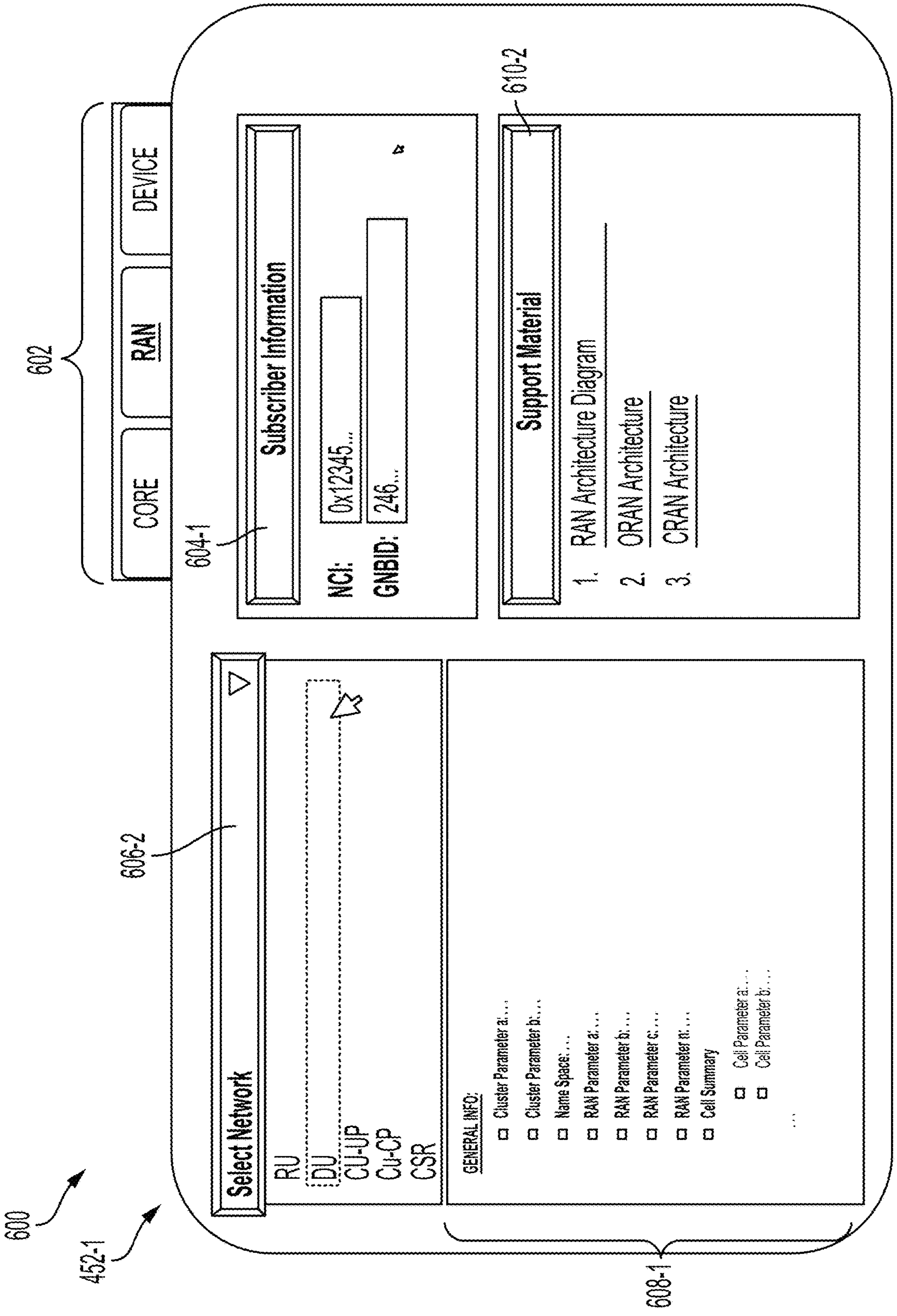

FIGS. 6, 7, and 8 are GUI examples 600 of some aspects of a diagnostics interface 452-1, in accordance with embodiments according to the present disclosure. In various embodiments, the diagnostics interface 452-1 may be provided via any suitable computing device, such as a desktop workstation, a laptop, a tablet, a smartphone, another mobile device, and/or the like, which may be configured with the NF tool 161 or may be configured to operate a virtual instance of the NF tool 161 and/or may be communicatively coupled to other components of the system 100 that include and operate the network diagnostic 161. While some examples are presented for illustration purposes, other embodiments are possible.

The diagnostics interface 452-1 may provide user-selection options 602 for core, RAN, and UEs, for example, as tabs. The depicted examples in FIGS. 6 and 7 show the core tab having been selected. The depicted example in FIG. 8 shows the RAN tab having been selected.

The diagnostics interface 452-1 may include one or more fields and/or selectable options to provide subscriber information 604. A user may enter one or more subscriber identifiers, such as an IMSI, an Integrated Circuit Card Identification (ICCID) number, a Mobile Station International Subscriber Directory Number (MSISDN), an International Mobile Equipment Identity (IMEI), and/or the like identifier. The diagnostics interface 452-1 may show available NFs 604 that can be queried and may include one or more selectable interface options 606 to select one or more NFs.

In FIG. 7, a selection of the AMF is shown. Consequent to the selection, parameters and corresponding values 608 may be shown for the AMF. Such parameters and values 608 may correspond to the selected NFs and corresponding selected set of parameters learned over time to be useful to troubleshooting (e.g., corresponding to roaming state, radio access type, DNNs, APN, and/or the like).

In some examples, the diagnostics interface 452-1 may also include support material 610 relating to the selected NFs and/or corresponding parameters. The support material 610 may be provided with user-selectable interface options to select, traverse, view, and annotate the various items included in the support material 610. The support material 610 may change depending on the NFs and/or parameters selected to be more pertinent to what is selected. For instance, in the example depicted in FIG. 7, a call flow diagram is shown after having been selected by the subsystem 160 and/or tool 161 as a function of the AMF having been selected and, optionally, after a user has selected to view the call flow diagram from a list of the supporting material 610. If the subsystem 160 and/or tool 161 identifies an issue, say bad voice quality, for example, the support material 610 may be selected as related to the to the ZIP code flow for UE A to UE B, the different interaction between the different network entities that come in between, what kinds of packets are being sent or received, what kind of parameters are useful to that issue, and/or the like. The support material 610 may include architectural diagrams, call flows, logical diagrams, screenshots, pictures, and/or the like that the subsystem 160 and/or tool 161 selected as a function of the NFs and/or parameters selected. In some embodiments, the subsystem 160 and/or tool 161 may additionally modify items of the support material 610 to highlight portions of the items that the subsystem 160 and/or tool 161 identify as relating to the NF and/or parameters selected and/or as being potential sources of an issue identified by the diagnostic rules of the subsystem 160 and/or tool 161.

The example of FIG. 8 shows functionalities similar to the core-specific examples in FIGS. 6 and 7 but with respect to the RAN. So, for example, the RAN-specific functionalities may include functionalities related to the RU, DU, etc. The parameters and corresponding values 608-1 may be specific to the RAN-specific NF selection selected with one or more selectable interface options 606-2. Likewise, the support material 610-2 may be specific to the RAN-specific NF selection.

Figure 9:
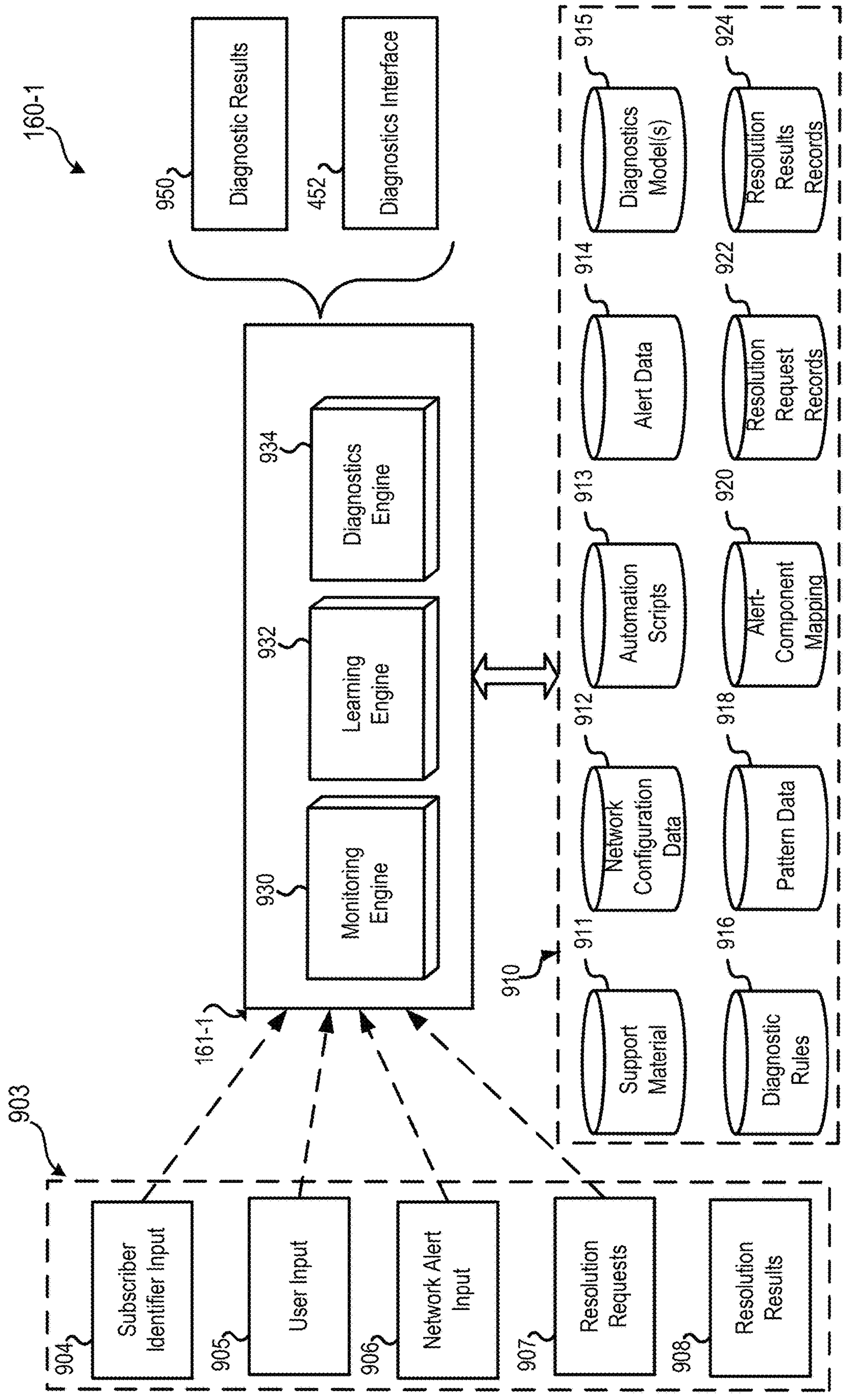
FIG. 9 illustrates an example cellular network diagnostics subsystem, including an example NF tool, to facilitate cellular network monitoring and diagnostics, in accordance with embodiments according to the present disclosure.

FIG. 9 illustrates an example cellular network diagnostics subsystem 160-1, including an example NF tool 161, to facilitate cellular network monitoring and diagnostics, in accordance with embodiments according to the present disclosure. While the subsystem 160-1 is illustrated as being composed of multiple components, it should be understood that the subsystem 160-1 may be broken into a greater number of components or collapsed into fewer components. Each component may include any one or combination of computerized hardware, software, and/or firmware.

The subsystem 160-1 may include the NF tool 161-1 and one or more data storage repositories 910, which may be included in or separately from the NF tool 161-1 and which may be located on the premises of a datacenter or remotely therefrom such as in the cloud. The subsystem 160-1 and the NF tool 161-1 may be communicatively coupled to the architecture of the system 100. In various embodiments, the NF tool 161-1 may be deployed in whole or in part with at a data center and/or at one or more edges of the cellular network system 100. In addition or alternative, the NF tool 161-1 may be deployed in whole or in part with the cloud-based cellular system components.

The NF tool 161-1 may be executed by one or more processors and may be communicatively coupled with interface components and communication channels (which may take various forms in various embodiments as disclosed herein) configured to receive electronic communications 903. The electronic communications 903 may include subscriber identifier input 904 and other user input 905. The subscriber identifier input 904 may include various user input and may include, for example, user input into the diagnostics interface 452 that indicates a phone number, IMSI, an ICCID number, a MSISDN, an IMEI, and/or the like identifier. The user input 905 may, for example, correspond to user input (e.g., user selections, field input, etc.) provided via the diagnostics interface 452.

In various embodiments, the subsystem 160-1 and/or the NF tool 161-1 may perform operations corresponding cellular network monitoring, diagnostics, and degradation mitigation using one or more cellular network diagnostic models 915, diagnostic rules 916, and/or pattern data 918. In some embodiments, one or more cellular network diagnostic models 915 may include the diagnostic rules 916 and/or the pattern data 918. In some embodiments, the NF tool 161-1 may include a diagnostics engine 934. The diagnostic engine 934 may be configured to determine and generate diagnostic results 950 and the diagnostics interface 452, which facilitates presentation of the diagnostic results 452. The NF tool 161-1 may include a monitoring engine 930 configured to monitor the subscriber identifier input 904, other user input 905, and other communications 903. In some embodiments, the monitoring engine 930 and/or the diagnostics engine 934 may filter the information pulled from the different network entities to determine only the results related to the particular subscriber and/or instances of no service availability, call drops, and/or the like issues related to the particular subscriber. In some embodiments, the one or more diagnostic models 915 may include one or more artificial intelligence models. In some embodiments, the NF tool 161-1 may use the one or more diagnostic models 915 to process the electronic communications 903 and analyze the electronic communications 903 to provide for cellular network monitoring and diagnostics features, including generating the diagnostic results 950 and generating the diagnostics interface 452.

Figure 10:
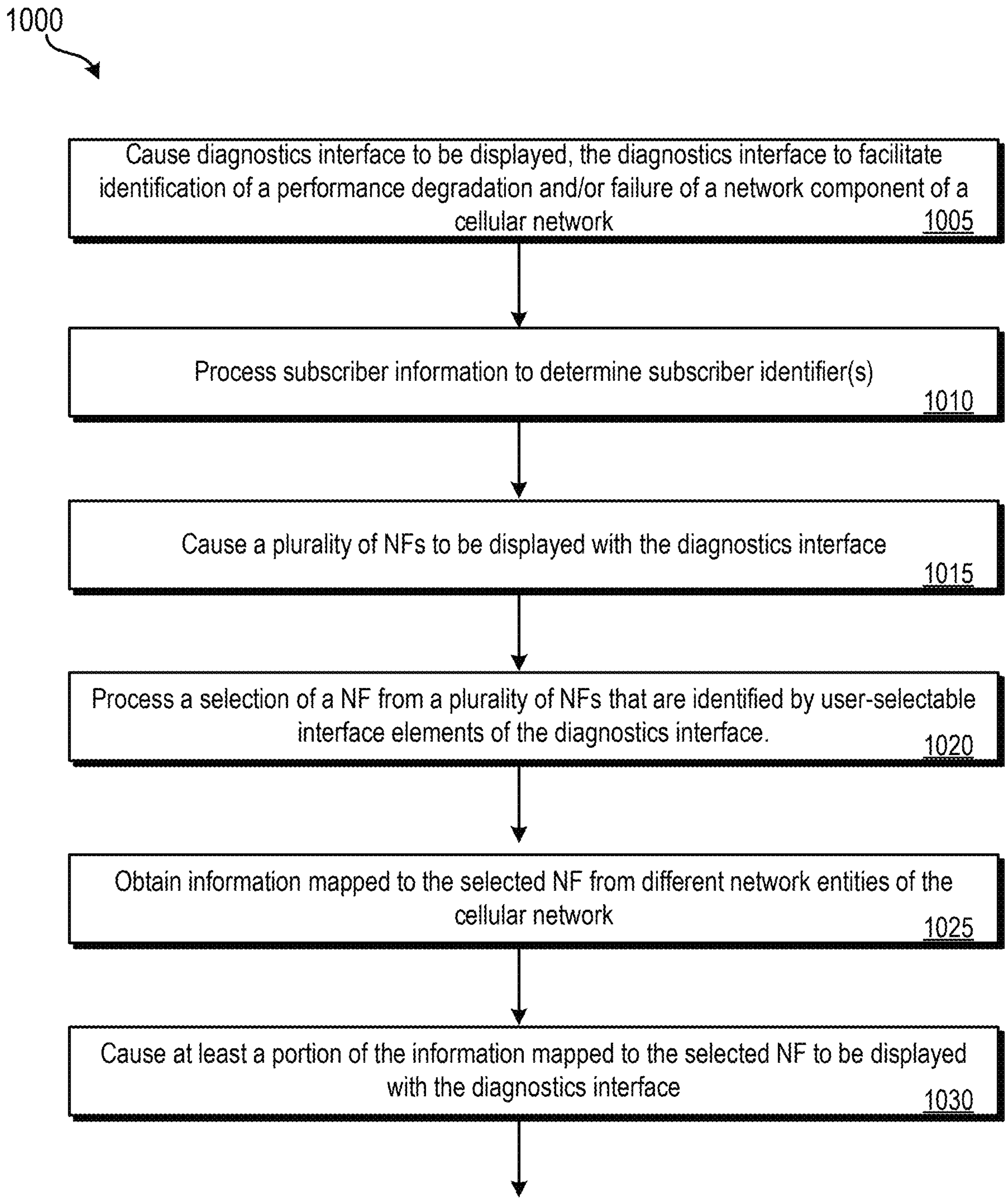
FIG. 10 illustrates an example method for cellular network monitoring, diagnostics, and degradation mitigation, in accordance with embodiments of the present disclosure

For example, FIG. 10 illustrates one example method 1000 for cellular network monitoring, diagnostics, and degradation mitigation, in accordance with embodiments of the present disclosure. One or a combination of the aspects of the method 1000 may be performed in conjunction with one or more other aspects disclosed herein, and the method 1000 is to be interpreted in view of other features disclosed herein and may be combined with one or more of such features in various embodiments. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein may be separated for the sake of description, it should be understood that certain steps may be performed simultaneously or substantially simultaneously.

As indicated by block 1005, a diagnostic interface 452 may be caused to be displayed, the diagnostics interface 452 to facilitate identification of a performance degradation and/or failure of a network component of a cellular network. The diagnostics interface 452 may provide one or more fields and/or selectable options to provide subscriber information. As indicated by block 1010, the subscriber information may be processed to determine one or more subscriber identifiers. The subscriber information may include one or a combination of a phone number, IMSI, an ICCID number, a MSISDN, an IMEI, and/or the like identifier.

As indicated by block 1015, a plurality of NFs may be caused to be displayed with the diagnostics interface 452. The plurality of NFs that may be identified by user-selectable interface elements of the diagnostics interface 452. In some embodiments, the plurality of NFs to be displayed may be determined based at least in part on network configuration data 912 (indicated in FIG. 9). As indicated by block 1020, a selection of a NF from a plurality of NFs that are identified by user-selectable interface elements of the diagnostics interface 452 may be processed. The NFs may be associated with one or more of the core network, the RAN, and/or the UE of the cellular network. In some embodiments, the selected NF may be mapped to the core network, the RAN, or the UE. As indicated by block 1025, information mapped to the selected NF may be obtained from different network entities of the cellular network. As indicated by block 1030, at least a portion of the information mapped to the selected NF may be caused to be displayed with the diagnostics interface 452. In various embodiments, the subsystem 160 and/or the tool 161, using the rules, scoring, and learning features disclosed herein, may rank the parameters according to the likelihood of usefulness to troubleshooting and only disclose the top-ranked 5, 10, 20, etc. lines of parameters.

Referring again to FIG. 9, in some embodiments, the diagnostics engine 934 may use the network configuration data 912 to determine the plurality of NFs to be displayed with the diagnostics interface 452. The subsystem 160-1 and/or the tool 161-1 may maintain an inventory of network configuration data 912. In some embodiments, the network configuration data 912 may be included in the one or more diagnostic models 915. The network configuration data 912 may specify how the system 100 (which may include system 300) is put together from a physical perspective and a logical perspective. In some embodiments, the network configuration data 912 may include mappings of everything in the system 100, as well as the AMF parameters 502, SMF parameters 504, UPF voice parameters 506, UPF data parameters 508, and/or the like. In some embodiments, the network configuration data 912 may include credentials for authentication and commands for the data retrieval disclosed herein, as well as mappings of NFs to domains and/or to the credentials for authentication and the commands for the data retrieval. In some embodiments, every single link of the system 160-1 may be mapped out and modeled by the subsystem 160-1 with specifications for links and terminations (e.g., a particular port is connected to a particular NID 115, etc.). In various embodiments, the repositories 910 may include one or a combination of one or more databases, one or more data systems, one or more inventory systems, and/or the like needed to facilitate the mappings and the one or more diagnostic models 915. Support material 911 may correspond to the support material 610 disclosed above. In some embodiments, the network configuration data 912 may include support material 911. In some embodiments, the support material 911 may be stored separately.

In some embodiments, the monitoring engine 930 and/or the diagnostics engine 934 may use the network configuration data 912 to obtain the information (e.g., parameter values and related information) mapped to the selected NF from different network entities of the cellular network. In some embodiments, the information may be obtained simultaneously from the different network entities. This may include making parallel queries across one or more domains, for example, by way of the subsystem 160 and/or the tool 161 causing execution of one or more automation scripts 913. The one or more automation scripts 913 may be configured to provide to each different network component authentication credentials and commands particular to the network component in order to obtain information from the network component that is associated with the selected NF. In some embodiments, the information may be pulled from all the network entities corresponding to all the domains simultaneously. In some embodiments, the information may be pulled simultaneously from all the network entities corresponding to less than all the domains (e.g., executing multiple, parallel queries across only the core domain, RAN domain, or devices domain; or only the core and RAN domains and not the UE domain). For example, if the core option or the RAN option is selected from the selectable interface options 602, only information for that domain may be pulled (or information for the core and RAN domains may be pulled together).

In some embodiments, the electronic communications 903 may include network alert input 906 may include one or a combination of signals or other communications corresponding to alerts, alarms, issues, and/or the like related to performance degradations, performance failures, component degradations, component failures, and/or the like. The subsystem 160-1 and/or the tool 161-1 may store alert data 914 corresponding to the network alert input 906. In some embodiments, the network alert input 906 may relate to particular subscriber issues and/or instances of bad voice quality, no service availability, call drops, and/or the like issues related to the particular subscriber which may be system-detected and/or system-entered via user input. In some embodiments, the network alert input 906 may include all network device alarm signals that may be received for all network components of the system 100. For example, the alarm input 906 may correspond to alarm signals triggered by and indicating one or a combination of: a node being detected as unreachable because of a disruption in a heartbeat/keep-alive signal from the node, and then the node being non-responsive to one or more confirmation pings; packet errors; various different faults; a door being opened; device temperatures exceeding one or more thresholds; CPU utilization exceeding one or more thresholds; operating parameters exceeding normal operating conditions and one or more thresholds; alarms on an antennae of a cell tower indicating overvoltage or undervoltage conditions; alarms indicating water in a line preventing proper reflection/propagation of RF signals; loss of power alarms; bursty traffic or network storm that is causing CPU utilization to go too high; communication disruptions from an edge router 135 to the core network 140; issues with a failover link between edge routers 135; and/or the like. The alarm input 906 may be caused by sensors and may correspond to any suitable alarm signal for any component of the system 100. Each alarm signal may include a site identifier (e.g., cell site 1, 2, . . . ), a device identifier (e.g., CSR 1, 2, . . . ) and/or a network identifier (e.g., VLAN 4), a port identifier (e.g., port 27-3), and a type of alarm and/or condition.

In some embodiments, the electronic communications 903 may include resolution requests 907. A resolution request 907 may correspond to a trouble ticket generated based at least in part on the diagnostic results 950. The diagnostics interface 452 may include a set of one or more user-selectable interface elements configured to allow for a generation of one or more resolution requests 907 (e.g., to run a self-test on a particular port, reconfigure an NF, changes a NF parameter, etc.) corresponding to the issues identified by the diagnostic results 950. In some embodiments, the subsystem 160-1 and/or the tool 161-1 may automatically generate resolution requests 907 and may directly assign issues to users having expertise with the particular domain and issue identified by the subsystem 160 and/or the tool 161. As resolution requests 907 are generated, the NF tool 161-1, using the one or more diagnostic models 915, may process the resolution requests 907 and store data corresponding to the resolution requests 907 in a resolution request records data storage 922. Thus, the one or more diagnostic models 915 may ingest the resolution requests 907 and learn from the resolution requests 907 to further adapt the one or more diagnostic models 915. The resolution requests records 922 may, for example, correspond to past trouble tickets generated based at least in part on the user input 905 and/or the NF tool 161-1 and associated with the particular items of alert data 914 and corresponding network alert-component mapping data 920. The network alert-component mapping data 920 may, for example, correspond to data regarding past correlations of particular sets of one or more alerts to corresponding sets of one or more network components that the NF tool 161-1 performed. Thus, as the NF tool 161-1 (in some embodiments, the one or more diagnostic models 915) correlates one or more alerts to one or more network components, the NF tool 161-1 may store the corresponding mapping data in the alarm component mapping data store 922. The alert data and alert-component mapping may include performance data, performance-component mapping, condition data, and condition-component mapping in accordance with various embodiments.

In some embodiments, the electronic communications 903 may include resolution results 908. The resolution results 908 may correspond to indicia of the results of the actions taken pursuant to the resolution request 907 and may be used in one or more ongoing learning/training modes of the NF tool 161-1 (e.g., to refine diagnostic rules 916 and pattern data 918 of the one or more diagnostic models 915 over time). The diagnostics interface 452 may include a set of one or more user-selectable interface elements configured to allow for indication of one or more resolution results 908 corresponding to the resolution requests 907. In some embodiments, the subsystem 160-1 and/or the tool 161-1 may automatically log resolution results 908 based on the automatic monitoring. The NF tool 161-1 may track each resolution request 907 made pursuant to the diagnostic results 950 to determine a corresponding resolution result 907. The resolution result 907 may indicate whether or not one or more remedial actions pursuant to the resolution request 907 were completed, a time of completion, and whether or not the one or more remedial actions were successful in providing a solution to the problem identified by the one or more diagnostic results 950.

The resolution results 908 may be based at least in part on user input 905 that may correspond to, for example, closing a trouble ticket and selecting or otherwise indicating remedial actions and their results. In some embodiments, the NF tool 161-1 may trace the resolution requests 907 to one or more network components specified by the resolution request 907 and monitor the one or more network components to determine if the one or more components become operational at a time corresponding to completion of the resolution requests 907 (e.g., a time window encompassing the time of completion, with a certain period of time before the detected time of completion and a certain period of time after the detected time of completion). The NF tool 161-1 may infer that a detection of the one or more components becoming operational contemporaneously with the detected time of completion indicates that the remedial action specified by the resolution request 907 was successful. The NF tool 161-1 may process the resolution results 908 and store corresponding resolution results data in a resolution results records data store 924.

In some embodiments, the information (e.g., parameter values and related information) mapped to the selected NF pulled from different network entities of the cellular network may correspond to selected NFs and corresponding selected set of parameters learned over time to be useful to troubleshooting. In some embodiments, the NF tool 161-1 may include a learning engine 932 that may be an analysis engine configured to learn the NFs and corresponding parameters that are useful to troubleshooting, which may include detection, evaluation, and diagnostics of problems that arise during operation of the system 100. For example, with the ongoing learning/training modes of the NF tool 161-1, the learning engine 932 may develop the pattern data 918 and use the pattern data 918 to identify one or more changes to a set of NFs and NF parameters, such as an additional NF parameter that was found to be indicative of a cause of an issue (e.g., a network performance or network component degradation or failure) and, therefore, is to be added to the set of NF parameters. Consequently, the learning engine 932 may modify the diagnostic rules 916 as a function of the addition to configure the diagnostics to evaluate the addition as part of a troubleshooting protocol. The learning engine 932 and/or the diagnostics engine 934 reconfigure, develop, revise, and/or otherwise modify or recreate the one or more automation scripts 913 to capture a different result set at least in part by pulling information corresponding to the addition from the corresponding network component that is associated with the additional NF parameter, using the network component authentication credentials and commands particular to the network component.

Additionally or alternatively, the learning engine 932 may, for example, determine that a previously selected NF parameter has not been indicative of a cause of an issue within a recency threshold (e.g., has not been indicative of a cause of an issue within a particular number of past years), a session threshold (e.g., has not been indicative of a cause of an issue for a particular number of incidents that have been evaluated with troubleshooting sessions), and/or a within a frequency threshold (e.g., has not been indicative of a cause of an issue at least a certain number of times over a particular time window) and, therefore, is to be removed from the set of NF parameters. Consequently, the learning engine 932 may modify the diagnostic rules 916 as a function of the removal to configure the diagnostics to not evaluate the parameter as part of a troubleshooting protocol, at least with that particular set of NFs and NF parameters. The learning engine 932 and/or the diagnostics engine 934 reconfigure, develop, revise, and/or otherwise modify or recreate the one or more automation scripts 913 to capture a different result set at least in part by no longer pulling information corresponding to the removed NF parameter, at least with that particular set of NFs and NF parameters.

In some embodiments, the removal may correspond to a demotion to a lower set of NFs and NF parameters in a hierarchy of sets. In some embodiments, the learning engine 932 may create hierarchically structured sets of NF parameters such that a first set may correspond to NF parameters determined by the learning engine 932 to have a high likelihood of being indicative of a cause of issue (e.g., using one or more the thresholds) and one or more other sets may correspond to NF parameters determined by the learning engine 932 to have one or more lower likelihoods of being indicative of a cause of issue. The one or more automation scripts 913 may be reconfigured, developed, revised, and/or otherwise modified or recreated accordingly. Thus, the first set may be used by the diagnostics engine 932 first to pull information and present the high likelihood NF parameters with the diagnostics interface 452 first, then subsequently use the one or more lower likelihood sets to iteratively pull information and present corresponding NF parameters as needed.

The learning engine 932 may include logic to implement and/or otherwise facilitate any taxonomy, classification, categorization, correlation, mapping, qualification, scoring, organization, and/or the like features disclosed herein. In various embodiments, the learning engine 932 may be configured to analyze, classify, categorize, characterize, tag, and/or annotate the alert data 914, the network configuration data 912, the diagnostic rules 916, the alert-component mapping 920, resolution requests 922, resolution records 924, and the pattern data 918 for the system 100. In some embodiments, the learning engine 932 may be configured to determine any suitable aspects pertaining to aspects of detection, evaluation, and diagnostics of problems that arise during operation of the system 100 based at least in part on the alarm input 908 received and processed by the monitoring engine 930.

In some embodiments, the learning engine 932 may be configured to select particular items of support material 911 as a function of the NFs and/or parameters selected with the diagnostics interface 452 to provide access to the selected items via the diagnostics interface 452 as in the examples disclosed above. In some embodiments, the learning engine 932 may use the alert-component mapping 920 to select the particular items. Additionally, the learning engine 932 may be configured to select particular items of support material 911 as a function of particular alerts detected in order to provide access to the item via the diagnostics interface 452. Accordingly, the selected items may change depending on the NFs and/or parameters selected and/or alerts detected.

In some embodiments, the learning engine 932 may be configured to modify the selected items of support material 911 to highlight portions of the items that the learning engine 932 identifies as relating to the NF and/or parameters selected and/or as being potential sources of an issue identified by the diagnostic rules 916. To recognize which portions of the items to highlight, the learning engine 932 may recognize identifiers of those aspects from the items by way of code mapping, keyword recognition, and/or another suitable method of recognition. In some embodiments, the learning engine 932 may use the alert-component mapping 920 to perform the recognition. In some embodiments, example, the learning engine 932 may identify keywords and/or codes as distinctive markings, collect and arrange them, and correlate them with recognition criteria (e.g., keyword criteria and/or code system) for the purposes of characterizing items of support material 911 and labeling/tagging portions in order to support recognition and highlighting. Such recognition processing may be performed in real time. In some embodiments, the recognition criteria may include keywords identified by any one or combination of words, word stems, phrase, word mappings, and/or like keyword information. The recognition criteria may include weighting assigned to words, word stems, phrase, word mappings, and/or the like. The recognition criteria may correspond to one or more keyword schemas that are correlated to various components. The recognition criteria may correspond to any other suitable means of linking, for example, via a code system, that may be used to associate recognized codes to specific components.

In some embodiments, the learning engine 932 may employ one or more artificial intelligence (machine learning or, more specifically, deep learning) algorithms to perform pattern matching to detect patterns 918 of the alert data 914, the network configuration data 912, the diagnostic rules 916, the alert-component mapping 920, the resolution requests 922, and/or the resolution records 924 for the system 100. The learning engine 932 may generate, develop, and/or otherwise use the network configuration data 912, the alert data 914, the alert-component mapping 920, the diagnostic rules 916, and/or the pattern data 918 based at least in part on the network components alarm input 908 and/or the user input 905. The learning engine 932 may, for example, correlate one or more alarm signals, one or more items of network configuration data 912, one or more diagnostic rules 916, and one or more patterns of the pattern data 918. The learning engine 932 may compile any one or combination of the network configuration data 912, the alert data 914, the diagnostic rules 916, the alert-component mapping 920, the resolution requests 922, and/or the resolution results 924 to create, for example, based at least in part on machine-learning, pattern data 918 that may include pattern particulars to facilitate detection, recognition, and differentiation of patterns for alarms, corresponding network components, corresponding diagnostic rules 916, corresponding diagnostic results 950, and/or the like.

The learning engine 932 may include a reasoning module to make logical inferences from a set of the detected and differentiated data to infer one or more patterns 918 of alert data 914, corresponding network alert-component mapping data 920, corresponding resolution requests 922, corresponding records of resolution 924 (e.g., past records of attempted resolutions, failed resolutions, and successful resolutions that resulted from the past trouble tickets), and/or the like for past instances of detected alerts, stored resolution requests, and stored resolutions. For instance, the pattern data may include information about any one or combination of alert histories, corresponding network component histories, corresponding resolution request histories, corresponding resolution histories, and/or the like, any set of which may be used to derive one or more of such patterns. A pattern-based reasoner could be employed to use various statistical techniques in analyzing the data in order to make inferences based on the analysis of the different types of alert identification data, network component identification data, corresponding resolution request data, and corresponding resolution data, both current and historical. A transitive reasoner may be employed to infer relationships from a set of relationships related to different types of alert identification data, network component identification data, corresponding resolution request data, and corresponding resolution data.

In various embodiments, the learning engine 932 and/or the diagnostics engine 934 may use the diagnostic models 915 and/or associated inferences to analyze the electronic communications 903 to identify one or more root causes of the performance degradations, performance failures, component degradations, component failures, and/or the like. Each electronic communication 903 may be analyzed (e.g., using one or more of the diagnostic models 915), and at least one network component of the cellular network system may be mapped to the electronic communication. The network alert input 906 may be grouped (e.g., using one or more of the diagnostic models 915) into one or more groups of alert data, performance data, and/or condition data based at least in part on one or more commonalities of cellular network components. One or more network components that correspond to a lowest common denominator for one or more groups of network alert input 906 may be identified (e.g., using one or more of the diagnostic models 915). The analyses may involve the NF tool 161-1 examining network configuration data 912 for mappings and specifications of the components of the architecture of this system 100 indicated by the network alert input 906 and related to such components to identify any commonalities of links, of devices, of circuits, etc. Having identified one or more commonalities, the NF tool 161-1, using the learning engine 932 and/or the diagnostic engine 934, may determine the lowest point of commonality for each set of network alert input 906 using the diagnostic rules 916. A hierarchical examination may then include examining one or more lower levels within the hierarchy for components that may also be experiencing problems indicated by, or otherwise corresponding to, the network alert input 906. The diagnostic results 950 may be generated (e.g., using one or more of the diagnostic models 915) based at least in part on the lowest common denominator for each group of the one or more groups of network alert input 906.

In some embodiments, the learning engine 932 and/or the diagnostics engine 934 may use a diagnostic scoring system. The diagnostic scoring system may score an identified potential issue with a numerical expression, for example, an identification score. For example, in some embodiments, an identification score may be an assessment of a probably that the identified potential issue is the actual cause of a set of one or more alarms, taking into account a number of factors, each of which may be weighted differently. By way of example, a diagnostic scale may include a range of identification scores from 0 to 100, or from 0 to 1,000, with the high end of the scale indicating greater probability. Some embodiments may use methods of statistical analysis to derive an identification score. Various embodiments may determine an identification score based on any one or more suitable quantifiers. An identification score may be based at least in part on the extent to which detected characteristics of the captured data match previously determined characteristics stored in the specifications. In some embodiments, an identification score may be cumulative of scores based on matching each type of the characteristics. With an identification score determined, categorizations may be made based on the score. By way of example without limitation, a score correlated to a 75-100% band may be deemed a positive identification of a cause; a score correlated to a 70-75% band may be deemed a possible identification; a score correlated to a 95-50% band may be deemed a weak identification; and a score below a 95% minimum threshold may be deemed a weak/insufficient identification.

The learning engine 932 and/or the diagnostics engine 934 may rank identified potential causes according to the scoring of each. Based in part on such analyses and scoring, the NF tool 161-1 may cause presentation of the most likely issues via the network diagnostic interface 452 (e.g., the NF tool 161-1 can diagnose that this subscriber is missing the Internet DNS, for example). The potential causes may be presented in a ranked order according to the probability that the NF tool 161-1 determined for each potential cause. In some embodiments, the NF tool 161-1 may correlate the identified potential causes to previous resolution requests 922 and corresponding resolution results 924 collected over time. The NF tool 161-1 may, for example, identify the three most likely issues from a network function operational perspective but may be able to identify the most common fault based at least in part on the resolution requests 922 and resolution results 924 in the last six months. Thus, the ranked potential causes may be filtered according to observed resolution requests 922 and corresponding resolution results 924. The most likely issues based on recent resolution requests/results may be indicated via the diagnostic interface 452. In some embodiments, relationships of potential causes to observed resolution requests 922 and corresponding resolution results 924 may be a factor in the scoring of the potential causes. In some embodiments, the observed resolution requests 922 and corresponding resolution results 924 may be tagged with recency attributes that correspond to time parameters respectively indicating when the requests 922 were instantiated and when the resolution results 924 were finalized. The recency attributes may be used in selecting resolution requests 922 and resolution results 924 according to a rolling time window. Accordingly, identification of potential causes may be a function of recency of observed resolution requests 922 and resolution results 924.

Figure 11:
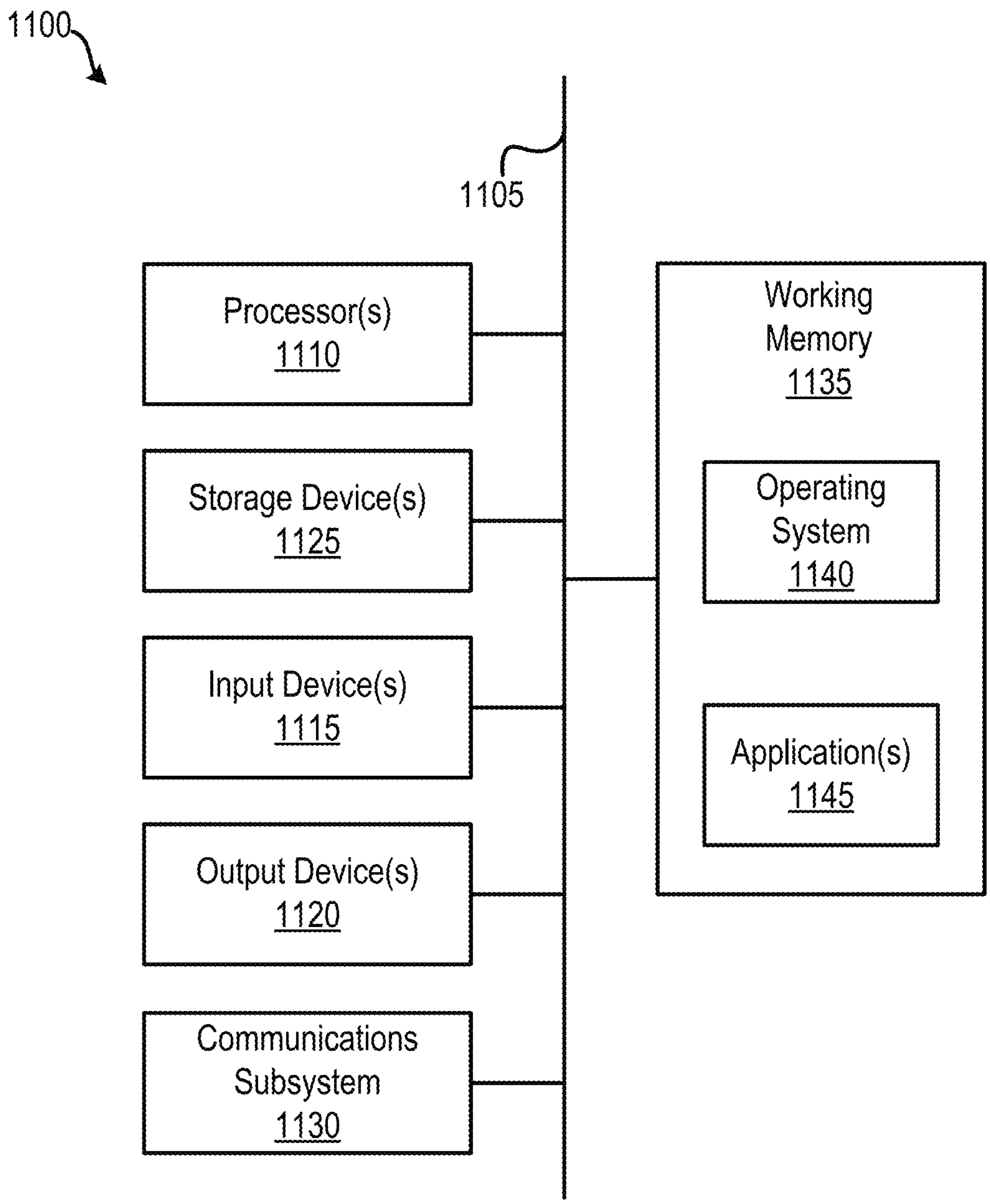
FIG. 11 illustrates one embodiment of a computer system that may be incorporated as part of the computerized devices that may be used for the subsystem, NF tool, and/or other computer components to perform various steps of the methods provided by various embodiments.

The monitoring engine 930 and/or the learning engine 932 may facilitate the one or more ongoing learning/training modes to confirm, correct, and/or refine determinations made for diagnostic rules 916, pattern data 918, and diagnostic results 950. For example, having come to one or more conclusions about, and generated, diagnostic rules 916, pattern data 918, and diagnostic results 950, the NF tool 161-1 may confirm and/or correct the determinations with feedback loop features that may be based at least in part on the user input 905 and/or the resolution results 908. In some embodiments, the diagnostics interface 452 may provide user-selectable feedback options to facilitate the ongoing learning mode. User-selectable feedback options may be provided via the diagnostics interface 452 with notifications (e.g., push notifications, overlays, windows, frames, etc.) to allow administrative confirmation or correction of conditions detected. The feedback could be used for training the NF tool 161-1 to heuristically adapt conclusions, specifications, correlations, attributes, triggers, patterns, and/or the like for diagnostic rules 916, pattern data 918, and diagnostic results 950.

computer system as illustrated in FIG. 11 may be incorporated as part of the computerized devices that may be used for the subsystem 160 and/or NF tool 161 and other computer components disclosed above. FIG. 11 provides a schematic illustration of one embodiment of a computer system 1100 that can perform various steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, video decoders, and/or the like); one or more input devices 1115, which can include without limitation a mouse, a keyboard, remote control, and/or the like; and one or more output devices 1120, which can include without limitation a display device, a printer, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data storages, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 1130 may permit data to be exchanged with a network (such as the network described below, to name one example), other computer systems, and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

As mentioned above, in one aspect, some embodiments may employ a computer system (such as the computer system 1100) to perform methods in accordance with various embodiments of the invention. According to a set of embodiments, some or all of the procedures of such methods are performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the non-transitory storage device(s) 1125. Merely by way of example, execution of the sequences of instructions contained in the working memory 1135 might cause the processor(s) 1110 to perform one or more procedures of the methods described herein.

The terms "machine-readable medium," "machine-readable media," "computer-readable storage medium," "computer-readable storage media," "computer-readable medium," "computer-readable media," "processor-readable medium," "processor-readable media," and/or like terms as used herein, refer to any medium that participates in providing data that causes a machine to operate in a specific fashion. These mediums may be non-transitory. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of non-volatile media or volatile media. Non-volatile media include, for example, optical and/or magnetic disks, such as the non-transitory storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 (and/or components thereof) generally will receive signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

It should further be understood that the components of computer system 1100 can be distributed across a network. For example, some processing may be performed in one location using a first processor while other processing may be performed by another processor remote from the first processor. Other components of computer system 1100 may be similarly distributed. As such, computer system 1100 may be interpreted as a distributed computing system that performs processing in multiple locations. In some instances, computer system 1100 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system comprising:

one or more processing devices; and memory communicatively coupled with, and readable by, the one or more processing devices and having stored therein processor-readable instructions which, when executed by the one or more processing devices, cause the system to perform operations comprising:

causing a user interface (UI) to be displayed, wherein:

the UI comprises UI elements that identify network functions (NFs) of network components, wherein the NFs are grouped according to domains, the domains comprising user equipment (UE), a radio access network (RAN), and a core network of a cellular network; and the UI comprises one or more user-selectable interface elements for each of the domains to identify a subset of the NFs grouped according to a selected domain;

receiving, via the UI, a selection of a network function (NF) from the subset of the NFs;

obtaining, from a network component corresponding to the selected NF, information associated with the NF; and causing the UI to be updated to display at least a portion of the information associated with the NF.

2. The system as recited in claim 1, wherein the UI indicates whether the NFs are associated with the UE, the RAN, or the core network.

3. The system as recited in claim 1, wherein the obtaining the information associated with the NF comprises providing authentication credentials to a network component corresponding to the NF.

4. The system as recited in claim 3, wherein the authentication credentials are particular to the network component corresponding to the NF, and others of the NFs require different authentication credentials.

5. The system as recited in claim 4, the operations further comprising:

receiving, via the UI, a subsequent selection of a second NF from the NFs;

obtaining second information associated with the second NF based at least in part on providing second authentication credentials to a second network component corresponding to the second NF; and causing the UI to be updated to display at least a portion of the second information associated with the second NF.

6. The system as recited in claim 1, wherein the portion of the information associated with the NF comprises one or more current parameter values corresponding to the NF.

7. The system as recited in claim 1, the operations further comprising:

responsive to the selection of the NF, selecting support material associated with the NF, and causing the UI to be updated to indicate the selected support material.

8. A method comprising:

causing a user interface (UI) to be displayed, wherein:

the UI comprises UI elements that identify network functions (NFs) of network components, wherein the NFs are grouped according to domains, the domains comprising user equipment (UE), a radio access network (RAN), and a core network of a cellular network; and the UI comprises one or more user-selectable interface elements for each of the domains to identify a subset of the NFs grouped according to a selected domain;

receiving, via the UI, a selection of a network function (NF) from the subset of the NFs;

obtaining, from a network component corresponding to the selected NF, information associated with the NF; and causing the UI to be updated to display at least a portion of the information associated with the NF.

9. The method as recited in claim 8, wherein the UI indicates whether the NFs are associated with the UE, the RAN, or the core network.

10. The method as recited in claim 8, wherein the obtaining the information associated with the NF comprises providing authentication credentials to a network component corresponding to the NF.

11. The method as recited in claim 10, wherein the authentication credentials are particular to the network component corresponding to the NF, and others of the NFs require different authentication credentials.

12. The method as recited in claim 11, further comprising:

receiving, via the UI, a subsequent selection of a second NF from the NFs;

obtaining second information associated with the second NF based at least in part on providing second authentication credentials to a second network component corresponding to the second NF; and causing the UI to be updated to display at least a portion of the second information associated with the second NF.

13. The method as recited in claim 8, wherein the portion of the information associated with the NF comprises one or more current parameter values corresponding to the NF.

14. The method as recited in claim 8, further comprising:

responsive to the selection of the NF, selecting support material associated with the NF, and causing the UI to be updated to indicate the selected support material.

15. One or more non-transitory, machine-readable media having machine-readable instructions thereon which, when executed by one or more processing devices, cause a system to perform operations comprising:

causing a user interface (UI) to be displayed, wherein:

the UI comprises UI elements that identify network functions (NFs) of network components, wherein the NFs are grouped according to domains, the domains comprising user equipment (UE), a radio access network (RAN), and a core network of a cellular network; and the UI comprises one or more user-selectable interface elements for each of the domains to identify a subset of the NFs grouped according to a selected domain;

receiving, via the UI, a selection of a network function (NF) from the subset of the NFs;

obtaining, from a network component corresponding to the selected NF, information associated with the NF; and causing the UI to be updated to display at least a portion of the information associated with the NF.

16. The one or more non-transitory, machine-readable media as recited in claim 15, wherein the UI indicates whether the NFs are associated with the UE, the RAN, or the core network.

17. The one or more non-transitory, machine-readable media as recited in claim 15, wherein the obtaining the information associated with the NF comprises providing authentication credentials to a network component corresponding to the NF.

18. The one or more non-transitory, machine-readable media as recited in claim 17, wherein the authentication credentials are particular to the network component corresponding to the NF, and others of the NFs require different authentication credentials.

19. The one or more non-transitory, machine-readable media as recited in claim 18, the operations further comprising:

receiving, via the UI, a subsequent selection of a second NF from the NFs;

obtaining second information associated with the second NF based at least in part on providing second authentication credentials to a second network component corresponding to the second NF; and causing the UI to be updated to display at least a portion of the second information associated with the second NF.

20. The one or more non-transitory, machine-readable media as recited in claim 15, wherein the portion of the information associated with the NF comprises one or more current parameter values corresponding to the NF.

* * * * *